(12) United States Patent
Dubrovin et al.

(10) Patent No.: US 8,898,214 B2
(45) Date of Patent: Nov. 25, 2014

(54) METHOD AND APPARATUS TO PERFORM FLOATING POINT OPERATIONS

(75) Inventors: Leonid Dubrovin, Karney Shomron (IL); Alexander Rabinovitch, Kfar Yona (IL)

(73) Assignee: LSI Corporation, Milpitas, CA (US)

( * ) Notice: Subject to any disclaimer, the term of this patent is extended or adjusted under 35 U.S.C. 154(b) by 365 days.

(21) Appl. No.: 13/453,056

(22) Filed: Apr. 23, 2012

(65) Prior Publication Data

US 2013/0282780 A1 Oct. 24, 2013

(51) Int. Cl.
*G06F 7/42* (2006.01)
(52) U.S. Cl.
USPC .......................................................... 708/505
(58) Field of Classification Search
CPC ..... G06F 7/485; G06F 7/49936; G06F 5/012; G06F 7/49947; G06F 7/572
USPC .......................................................... 708/505
See application file for complete search history.

(56) References Cited

U.S. PATENT DOCUMENTS

| 5,111,421 | A | 5/1992 | Molnar et al. |
| 5,146,419 | A | 9/1992 | Miyoshi et al. |
| 5,550,768 | A | 8/1996 | Ogilvie et al. |
| 5,568,412 | A | 10/1996 | Han et al. |
| 5,931,895 | A | 8/1999 | Yamada et al. |
| 6,085,208 | A | 7/2000 | Oberman et al. |
| 7,054,898 | B1 | 5/2006 | Tzeng et al. |
| 2006/0036667 | A1 | 2/2006 | Srivastava |
| 2008/0270500 | A1 | 10/2008 | Lundvall et al. |
| 2009/0172065 | A1 | 7/2009 | Cornea-Hasegan |
| 2010/0100713 | A1 | 4/2010 | Boersma et al. |
| 2011/0208794 | A1 | 8/2011 | Ahmed |
| 2012/0259905 | A1* | 10/2012 | Kan et al. ....................... 708/505 |
| 2012/0259906 | A1* | 10/2012 | Kan et al. ....................... 708/505 |

* cited by examiner

*Primary Examiner* — Tan V. Mai
(74) *Attorney, Agent, or Firm* — Daniel J. Santos; Smith Risley Tempel Santos LLC

(57) ABSTRACT

A method of subtracting floating-point numbers includes determining whether a first sign associated with a first floating-point number is unequal to a second sign associated with a second floating-point number, determining whether a first exponent associated with the first floating-point number is less than a second exponent associated with the second floating-point number, negating a first mantissa associated with the first floating-point number when the first sign is unequal to the second sign and determining that the first exponent is less than the second exponent, and adding the first mantissa to a second mantissa associated with the second floating-point number when the first sign is unequal to the second sign and determining that the first exponent is less than the second exponent. Embodiments of a corresponding computer-readable medium and device are also provided.

21 Claims, 9 Drawing Sheets

METHOD AND APPARATUS TO PERFORM FLOATING POINT OPERATIONS

BACKGROUND

Embodiments of the invention relate generally to electronic devices and circuits and, more particularly, relate to methods, devices, and computer-readable media for performing floating-point operations.

The Institute of Electrical and Electronic Engineers (IEEE) 754 standard (e.g., IEEE 754-1985: Standard for Binary Floating-Point Arithmetic (1985), and superseding standard IEEE 754-2008, which are incorporated herein by reference in their entireties for all purposes) governs binary floating-point arithmetic and the representation of number formats, basic operations, conversions, and exceptional conditions. IEEE 754 provides definitions for four levels of precision, two of the most commonly used of which are listed in Table 1 below.

TABLE 1

| Level | Width | Range | Precision |
|---|---|---|---|
| single precision | 32 bits | $\pm 1.18 \times 10^{-38}$ to $\pm 3.4 \times 10^{38}$ | about 7 decimal digits |
| double precision | 64 bits | $\pm 2.23 \times 10^{-308}$ to $\pm 1.80 \times 10^{308}$ | about 15 decimal digits |

The IEEE 754 standard also defines representations for positive and negative infinity, negative zero, five exceptions to handle invalid results, such as division by zero, special values referred to as Not-a-Numbers (NaNs) for representing those exceptions, denormal numbers for representing numbers less than the ranges shown in Table 1, and five rounding modes.

Floating-point numbers in IEEE 754 format include three fields; namely, a sign bit, biased exponent, and fraction. For example, the decimal number $0.15625_{10}$ represented in binary is $0.00101_2$ (that is, $\frac{1}{8}+\frac{1}{32}$), wherein numbers in subscript indicate the base. Analogous to scientific notation, in which numbers are written to have a single non-zero digit to the left of the decimal point, numbers in IEEE 754 format are written to have a single 1 bit or significand to the left of the binary point. The significand is multiplied by the appropriate power of two to compensate for shifting the bits left by three positions as follows:

$$0.00101_2 = 1.01_2 \times 2^{-3}. \quad (1)$$

Thus, a fraction of the number in (1) above is "$0.01_2$" and an exponent of this number is "−3."

SUMMARY

Embodiments of the invention include methods, devices, and computer-readable media for increasing the speed and performance of floating-point devices while reducing the board or silicon area required by such devices. In this manner, aspects of the embodiments of the invention reduce the size and power consumption of processing systems performing floating-point operations, such as, for example, floating-point subtraction.

In accordance with one embodiment of the invention, a method of subtracting floating-point numbers includes determining whether a first sign associated with a first floating-point number is unequal to a second sign associated with a second floating-point number; determining whether a first exponent associated with the first floating-point number is less than a second exponent associated with the second floating-point number; negating a first mantissa associated with the first floating-point number in response to determining that the first sign is unequal to the second sign and the first exponent is less than the second exponent; and adding the first mantissa to a second mantissa associated with the second floating-point number in response to determining that the first sign is unequal to the second sign and the first exponent is less than the second exponent, thereby subtracting the first floating-point number from the second floating-point number.

In accordance with other embodiments of the invention, a corresponding computer-readable medium and device are also provided.

Embodiments of the invention will become apparent from the following detailed description, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that are useful in a commercially feasible embodiment are not necessarily shown in order to facilitate a less hindered view of the illustrated embodiments.

DETAILED DESCRIPTION

Embodiments of the invention will be described herein in the context of methods and apparatus for performing binary floating-point operations on exemplary numbers, such as, for example, floating-point addition and subtraction, and floating-point adders configured to provide reduced area requirements and increased performance compared to conventional apparatus and methods. It should be understood, however, that embodiments of the invention are not limited to these or any other particular devices and/or methods. Rather, embodiments of the invention are more generally applicable to techniques for improving floating-point operations while reducing integrated circuit area requirements and increasing speed and/or performance of floating-point operations.

While embodiments of the invention may be described herein with reference to specific standards (e.g., IEEE 754-1985, IEEE 754-2008) for performing floating-point operations and/or specific formats for representing numbers, basic operations, conversions, and/or exceptional conditions, it is to be understood that embodiments of the invention are not limited to use with these specific standards or formats, and that embodiments of the invention may be employed with other standards or formats for performing floating-point operations, as will become apparent to those skilled in the art. Moreover, it will become apparent to those skilled in the art given the teachings herein that numerous modifications can be made to the embodiments herein that are within the scope of the disclosure. That is, no limitations with respect to the embodiments shown and described herein are intended or should be inferred.

As previously stated in connection with Table 1 above, the IEEE 754 standard sets forth a format for representing numbers in binary and provides definitions for four levels of precision, two of the most commonly used of which are shown in Table 1. IEEE 754 also defines representations for positive and negative infinity, negative zero, five exceptions to handle invalid results, such as division by zero, special values referred to as Not-a-Numbers (NaNs) for representing those exceptions, denormal numbers for representing numbers less than the ranges shown in Table 1, and five rounding modes.

Figure 1:
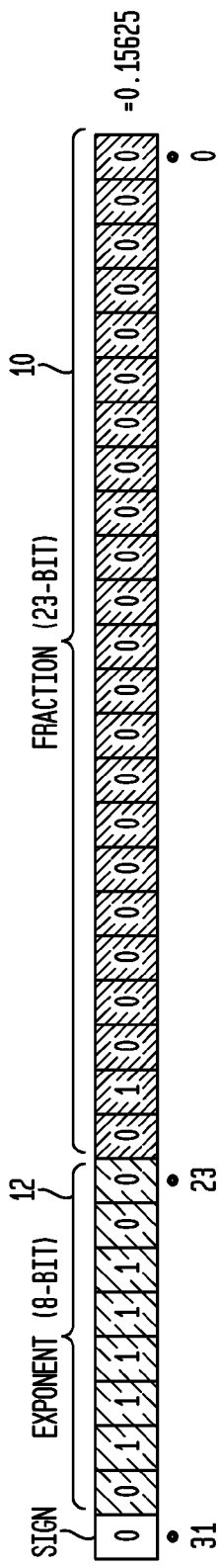
FIG. 1 conceptually illustrates a 32-bit floating-point format in accordance with an IEEE 754 standard.
Figure 2:
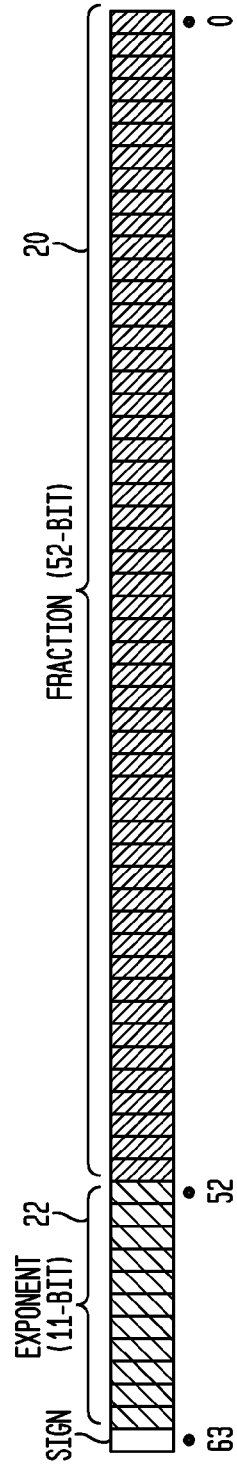
FIG. 2 conceptually illustrates a 64-bit floating-point format in accordance with an IEEE 754 standard.

FIG. 1 conceptually illustrates a 32-bit floating-point format in accordance with an IEEE 754 standard. With reference to FIG. 1, the 32-bit number comprises a 23-bit fraction portion 10, an 8-bit exponent portion 12, and a sign bit (which can be "0" indicative of a positive number or "1" indicative of a negative number). As shown in FIG. 1, the three fields in the IEEE 754 representation of the exemplary number $0.00101_2 = 1.01_2 \times 2^{-3}$ in expression (1) above are as follows: (i) a sign equal to 0 because the number is positive; (ii) a fraction equal to $0.0101_2$; and (iii) a biased exponent equal to −3 plus the bias. In single-precision format, the bias is 127. Thus, in this example, the biased exponent is 124. In double-precision, the bias is 1023. Thus, the biased exponent for this example would be 1020. Similarly, FIG. 2 conceptually illustrates a 64-bit floating-point format in accordance with the IEEE 754 standard. As apparent from FIG. 2, in a 64-bit IEEE 754 representation, the 64-bit number comprises a 52-bit fraction portion 20, an 11-bit exponent portion 22, and a sign bit.

IEEE 754 adds a bias to the exponent so that numbers are readily comparable by the same hardware that compares signed 2's-complement integers. By using a biased exponent, the lesser of two positive floating-point numbers will be less than the greater number following the same ordering as for sign-and-magnitude integers. If two floating-point numbers have different signs, the sign-and-magnitude comparison also functions with biased exponents. However, if both biased-exponent floating-point numbers are negative, then the ordering is reversed. If the exponent is represented as a 2's-complement number, a comparison to determine which number is greater would not be as convenient. The leading "1" bit is omitted. Since all numbers, except zero, start with a leading 1, the leading 1 is implicit. The number zero is represented with a sign of 0 for positive zero, a sign of 1 for negative zero, a biased exponent of 0, and a fraction of 0.

Regarding denormalized numbers, the number representations described above are called normalized, which indicates that the implicit leading binary digit is 1. To reduce a loss in precision when an underflow occurs, the IEEE 754 format incorporates the ability to represent fractions smaller than what is otherwise possible using the normalized representation by making the implicit leading digit zero. Such numbers are called denormal. Denormal numbers do not include as many significant digits as normalized numbers, but enable a gradual loss of precision in cases in which a result of an arithmetic operation is not exactly zero but is too close to zero to be represented by a normalized number. A denormal number is represented with a biased exponent of all 0 bits, which represents an exponent of −126 in single-precision format (not −127) or −1022 in double-precision format (not −1023).

Non-numbers are represented by a biased-exponent field filled with all 1's to indicate either infinity or an invalid result computational result. Positive and negative infinity are represented with a sign of 0 for positive infinity, a sign of 1 for negative infinity, a biased exponent of all 1's, and a fraction of all 0's.

Regarding the representation of NaNs, some operations in floating-point arithmetic are invalid, such as dividing by zero or taking the square root of a negative number. The act of reaching an invalid result is called a floating-point exception. Exceptions are represented by a special code called a NaN, which represents a "Not-a-Number" result. NaNs in the IEEE 754 standard have a sign of either 0 or 1, a biased exponent of all 1's, and a fraction of anything but all 0's, since all 0's would represent infinity.

The term precision as used herein is intended to be broadly defined as a minimum difference between two successive mantissa representations. Thus, precision is only a function of the mantissa. The term gap as used herein is intended to be broadly defined as a difference between two successive numbers.

The IEEE 754-2008 standard, which supersedes IEEE 754-1985, includes nearly all of the original IEEE 754-1985 standard as well as IEEE 854: Standard for Radix-Independent Floating-Point Arithmetic (IEEE 854-1987). IEEE 754-2008 defines arithmetic formats, rounding algorithms, operations, and exception handling. Arithmetic formats are sets of binary and decimal floating-point data that include finite numbers (such as signed zeros and subnormal numbers), infinities, and NaNs. Interchange formats are encodings (bit strings) that are used to exchange floating-point data in a compact form. Rounding algorithms are methods to be used for rounding numbers during arithmetic and conversions. Operations include arithmetic and other operations on arithmetic formats, and exception handling provides indications of exception conditions, such as division by zero and overflow.

Formats in IEEE 754 describe sets of floating-point data and encodings for their interface. A given format includes finite numbers, two infinities (+∞ and −∞), and two types of NaN. A finite number, which is either base 2 (binary) or base 10 (decimal), is described by three integers: a sign s of zero or one, a significand mantissa or coefficient c, and an exponent q. Thus, the numerical value of a finite number is described as follows:

$$(-1)^s \times c \times b^q, \quad (2)$$

where b is the base (e.g., 2 for a binary number or 10 for a decimal number). For example, if the sign is 1 (indicating a negative number), the significand is 12345, the exponent is −3, and the base is 10, then the value of the number is −12.345. A NaN also carries a payload intended for diagnostic information indicating the source of the NaN. The sign of a NaN has no meaning, but is predictable in some circumstances.

The possible finite values represented in a given format are determined by the base b, the number of digits in the significand, which is referred to as the precision p, and the exponent parameter emax. The coefficient c is an integer in a range of zero through $b^p-1$ (for example, if b=10 and p=7, then c is 0 through 9999999). The exponent q is an integer such that 1−emax≤q+p−1≤emax (for example, if p=7 and emax=96, then q is −101 through 90).

Thus, using the parameters in the example above, the smallest non-zero positive number that can be represented is 1×10−101, the largest is 9999999×1090 (9.999999×1096), and the full range of numbers is −9.999999×1096 through 9.999999×1096. The numbers $-b^{1-emax}$ and $b^{1-emax}$ (here, $-1 \times 10^{-95}$ and $1 \times 10^{-95}$) are the smallest (in magnitude) normal numbers. Non-zero numbers between these smallest numbers are called subnormal numbers.

Zero values are finite values with a significand of 0. These are signed zeros, in which the sign bit specifies whether the zero is +0 (positive zero) or −0 (negative zero).

IEEE 754-2008 defines five basic formats, which are named using their base and the number of bits used to encode them. A conforming implementation utilizes at least one of these basic formats. There are three binary floating-point basic formats, which can be encoded using 32, 64, or 128 bits, and two decimal floating-point basic formats, which can be encoded using 64 or 128 bits.

The precision of the binary formats is one greater than the width of the significand, since there is an implied (i.e., hidden) 1 bit. The formats of IEEE 754-2008 are shown in Table 2 below.

TABLE 2

| Name | Common name | Base | Digits | E min | E max | Decimal digits | Decimal E max |
|---|---|---|---|---|---|---|---|
| binary16 | Half precision | 2 | 10 + 1 | −14 | +15 | 3.31 | 4.51 |
| binary32 | Single precision | 2 | 23 + 1 | −126 | +127 | 7.22 | 38.23 |
| binary64 | Double precision | 2 | 52 + 1 | −1022 | +1023 | 15.95 | 307.95 |
| binary128 | Quadruple precision | 2 | 112 + 1 | −16382 | +16383 | 34.02 | 4931.77 |
| decimal32 | | 10 | 7 | −95 | +96 | 7 | 96 |
| decimal64 | | 10 | 16 | −383 | +384 | 16 | 384 |
| decimal128 | | 10 | 34 | −6143 | +6144 | 34 | 6144 |

An arithmetic format that is used for arithmetic and other operations does not require an associated encoding. That is, an implementation can use whatever internal representation that is available. All that is to be defined are the parameters (e.g., b, p, and emax). These parameters uniquely describe the set of finite numbers (combinations of sign, significand, and exponent) that can be represented.

Interchange formats are intended for the exchange of floating-point data using a fixed-length bit-string for a given format. For the exchange of binary floating-point numbers, interchange formats of 16 bits, 32 bits, 64 bits, and any multiple of 32 bits greater than or equal to 128, are defined.

IEEE 754-2008 defines five rounding algorithms. The first two algorithms round to a nearest value, and the others algorithms are called directed roundings. A so-called "round to nearest-ties to even" algorithm rounds to the nearest value, but if the number falls midway between two values, it is rounded to the nearest value with an even (zero) least significant bit. This is the default algorithm for binary floating-point operations and the recommended default for decimal operations. A so-called "round to nearest-ties away from zero" algorithm rounds to the nearest value, but if the number falls midway between two values, it is rounded to the nearest value above for positive numbers, or below for negative numbers.

Directed rounding algorithms include a "round toward zero" algorithm, which directs rounding towards zero (also known as truncation), a "round toward positive infinity" algorithm, which directs rounding towards positive infinity (also known as rounding up or ceiling), and a "round towards negative infinity" algorithm, which directs rounding towards negative infinity (also known as rounding down or floor).

IEEE 754-2008 floating-point numbers are typically packed into computer memory using an internal representation, from left to right, which includes a sign bit, exponent field, and significand or mantissa. Binary formats are apportioned according to IEEE 754-2008 as shown in Table 3 below.

TABLE 3

| Precision Type | Sign | Exponent | Significand | Total bits | Exponent bias |
|---|---|---|---|---|---|
| Half | 1 | 5 | 10 | 16 | 15 |
| Single | 1 | 8 | 23 | 32 | 127 |
| Double | 1 | 11 | 52 | 64 | 1023 |
| Quad | 1 | 15 | 112 | 128 | 16383 |

While exponents can be positive or negative in binary formats, exponents are stored as an unsigned number with a fixed bias added to the exponent. Values of all 0's in the exponent field are reserved for zeros and subnormal numbers. Values of all 1's are reserved for infinite number and NaNs. Denormal numbers, denormalized numbers, or sub-normal numbers fill an underflow gap around zero in floating-point operations. Any non-zero number that is smaller than the smallest normal number is considered subnormal. For example, if the smallest positive normal number is 1×β−n (where β is the base of the floating-point system, usually 2 or 10), then any smaller positive numbers that can be represented are subnormal.

In IEEE binary interchange formats, the leading 1-bit of a normalized significand is not actually stored in computer representations. This 1-bit is called the "hidden" or "implicit" bit. Because of this, single-precision format actually has a significand with 24 bits of precision, double-precision format has 53 bits, and quad-precision format has 113 bits. For example, consider the number π, rounded to 24 bits of precision, has a sign=0; e=1; and s=110010010000111111011011 (including the hidden bit). The sum of the exponent bias (127) and the exponent is 128, which is represented in single precision format as 0 10000000 10010010000111111011011 (excluding the hidden bit), and 40490FDB in hexadecimal format.

The illustrative embodiments of the invention described herein are directed to implementations of a floating-point adder that significantly reduce the area of conventional floating-point adders while improving their speed and performance when performing floating-point operations, such as, but not limited to, subtraction.

Floating-point numbers (FPN) are represented as follows:

$$a=(-1)^{s}*2^{exp+bias}*1\cdot\text{mantissa},\qquad(3)$$

where a is equal to the arithmetic representation of the FPN, s is equal to the sign of the FPN, exp is equal to the exponent of the FPN, and bias is equal to the bias of the exponent. For example, the number, 0.000000023458, is equal to 0.23458× $10^{-7}$ in decimal format, which is equal to 0.000000023458= $(-1)^{0}*2^{-26+127}*1.5742397$) using the format shown in equation (3) above. As another example, the number, 2345800000000000 is equal to $0.23456\times10^{16}$ in decimal format, which is equal to 2345800000000000=$(-1)^{0}*2^{51+127}*1.0417445$) in the format shown in equation (3) above.

For at least one embodiment of the invention, floating-point addition or subtraction operations are performed as follows:
1. the difference between exponents of the two numbers is calculated;
2. the mantissa with the smaller exponent is arithmetically shifted right a number of places equal to the difference between the exponents, and the mantissa with the greater exponent is padded with trailing zeros;
3. the shifted mantissa (that is, the mantissa with the smaller exponent) is added to or subtracted from the mantissa with the larger exponent;
4. if subtraction is performed and the result of the subtraction is negative, then the result is negated;
5. the result of the addition or subtraction is normalized and rounded; and
6. the sign bit and exponent are updated.

If addition is performed (for example, a+b, where both a and b are positive, or a−b, where a is positive and b is negative), the exponent of the normalized result is either equal to k (which is the exponent of the largest of the numbers being added) or k+1, which is determined by the magnitude of the numbers being added. For example, if, in decimal notation, 1.99 is added to 0.02, the result is 2.01, and thus the exponent is equal to k in this case. However, if, in decimal notation, 9.98 is added to 0.07, the result is 10.05, and thus the exponent is equal to k+1 in this case. An N+2 bit-wide adder, normalizer, and incrementer are used for rounding, as shown in FIGS. 3 and 4; here, N represents a length of the mantissa plus one due to the hidden bit, which is equal to one.

Figure 3:
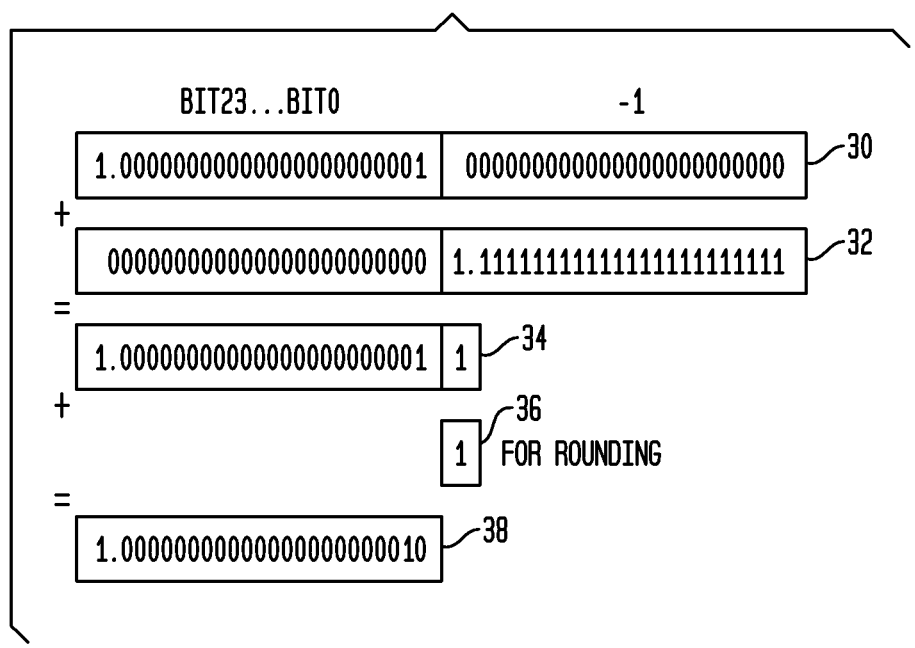
FIG. 3 conceptually illustrates an exemplary addition of two numbers with 23-bit wide mantissas and a 24-bit difference between exponents, in which rounding to the nearest value is performed.

By way of example only, with reference to FIG. 3, two numbers, 30 and 32, each of which comprises a 23-bit mantissa, are added. The exponents of the numbers 30, 32 are not shown for simplicity of presentation. There is a 24-bit difference between exponents of the two numbers 30, 32, and rounding to the nearest value is used. The exponent of the result is k, the exponent of the largest number being added, which is number 30. The mantissa of the number 32 with the smaller exponent has been arithmetically shifted right by a number of bits equal to the absolute value of the difference between the exponents (24 bits) and padded with leading zeros as shown in FIG. 3. The mantissa of the number 30 with the greater exponent has been padded with trailing zeros, as shown in FIG. 3. The numbers 30, 32 are then added resulting in number 34, which is normalized and rounded by examining bit 24 of the resulting number 34. If bit 24 of the result 34 is equal to 0, then additional shifts are not required. However, if bit 24 of the result 34 is equal to 1, then a right shift by one bit is performed. Number 36 represents a rounding constant. Rounding to the nearest value can be performed by adding 1 to the first bit position, which is then discarded following rounding. In this case, 1 is added to bit position 1, and any bits to the right, including the bit in position 1, are disregarded following rounding. The result of rounding is shown as number 38.

Figure 4:
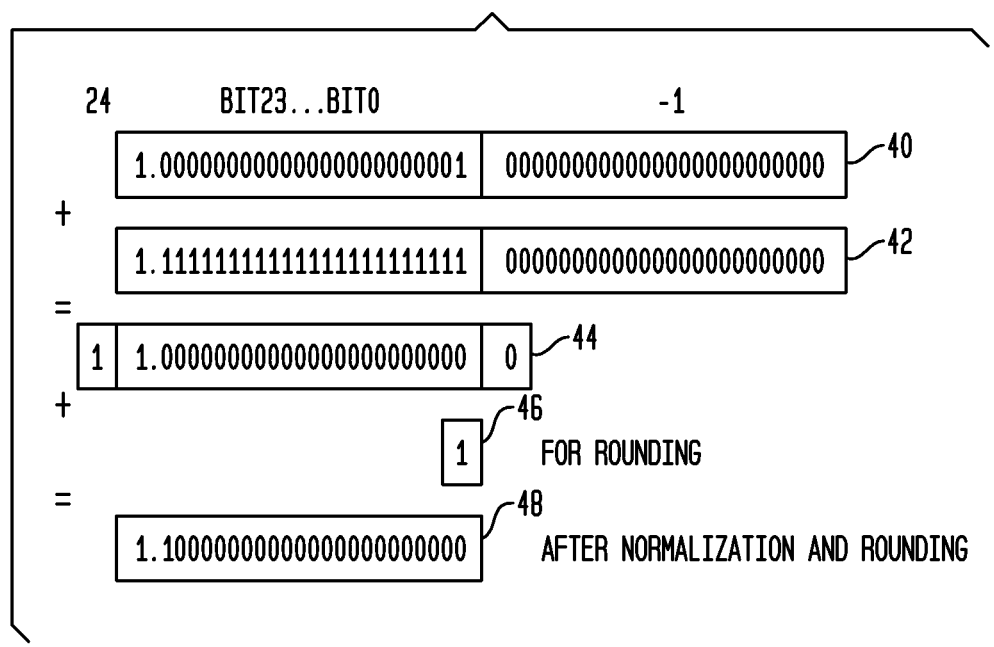
FIG. 4 conceptually illustrates an exemplary addition of two numbers with 23-bit wide mantissas and a 0-bit difference between exponents, in which rounding to the nearest value is performed.

As another example, FIG. 4 depicts two numbers, 40 and 42, each of which has a 23-bit mantissa, being added. There is a 0-bit difference between exponents of the two numbers 40 and 42, and rounding to the nearest value is used. The exponent of the result is k+1 since the sum of these two mantissas is greater than two, which indicates that the result should be shifted right by 1 bit, and thus the exponent should be incremented. Both numbers 40 and 42 have been padded with trailing zeros, as shown in FIG. 4. The numbers 40 and 42 are then added resulting in number 44, which is normalized and rounded. The "0" to the right of number 44 represents a sum of the corresponding bits (that are zeros in this case) of the numbers 40 and 42. The "1" to the left of number 44 represents the carry bit of the sum of numbers 40 and 42 (for example, in decimal, 1.999+1.001=3). The result of normalization and rounding is shown as number 48.

If subtraction is to be performed (for example, a−b, where a and b are both positive), the subtraction operation is performed as an addition in two's complement notation. The subtraction operation includes two different scenarios described in further detail herein below.

Figure 5:
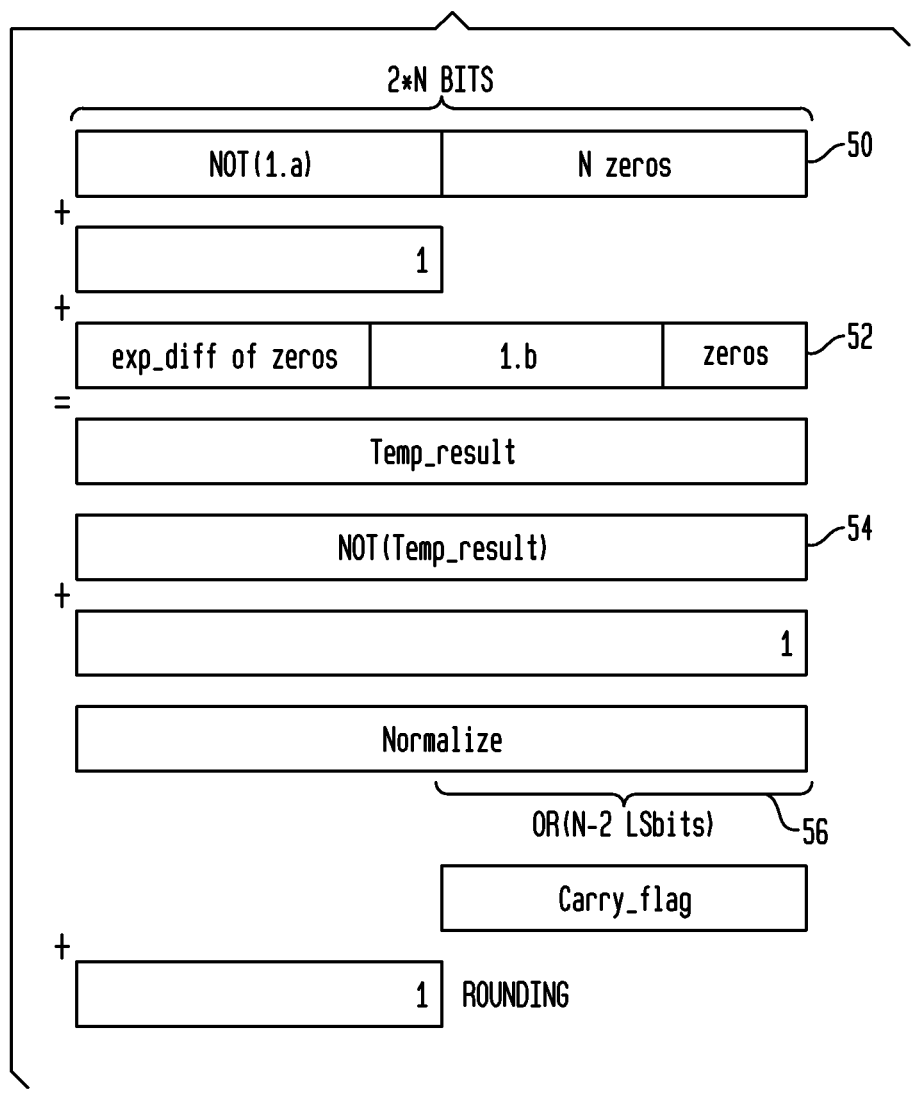
FIG. 5 conceptually illustrates an exemplary subtraction of a number with a larger exponent from a number with a smaller exponent, in which rounding to the nearest even value is performed.
Figure 6:
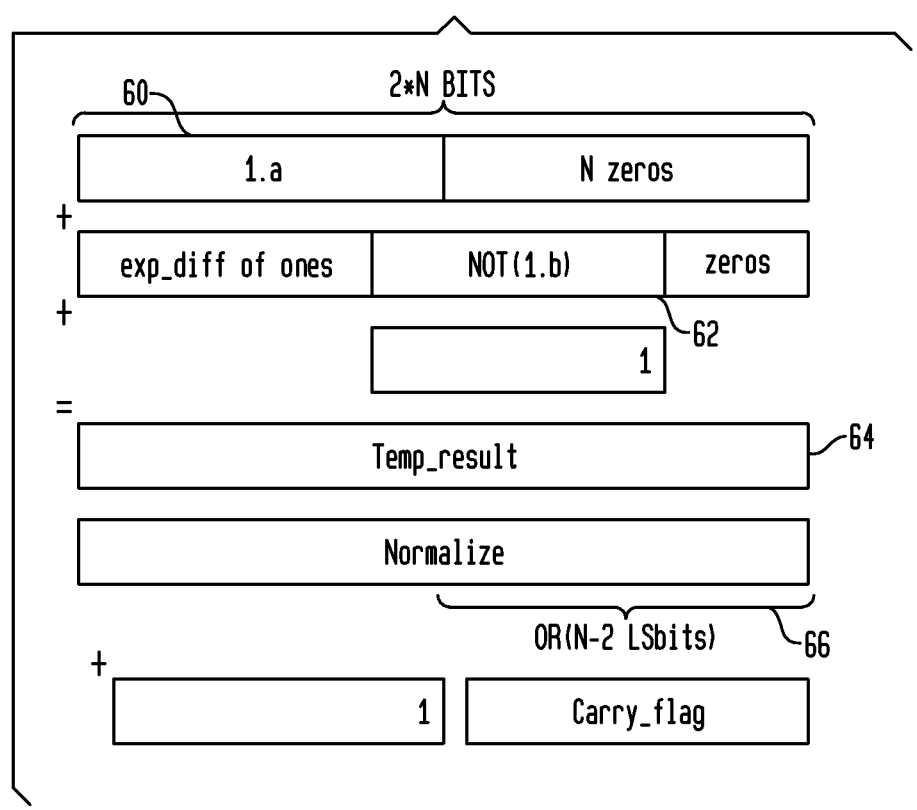
FIG. 6 conceptually illustrates an exemplary subtraction of a number with a smaller exponent from a number with a larger exponent, in which rounding to the nearest even value is performed.

In a first scenario, the absolute value of the difference between exponents of the numbers being subtracted is not zero. The difference between exponents, exp_diff, is determined using the following equation:

$$\text{exp\_diff}=\text{abs}(\exp(a)-\exp(b))),\qquad(4)$$

where a and b represent the numbers to be subtracted, exp(a) and exp(b) represent exponents of the numbers to be subtracted, and abs represents an absolute value function. In this case, the sign of the result of the subtraction operation equals the sign of the number with the larger exponent. FIG. 5 conceptually illustrates an exemplary subtraction of a number (a) 50 with a larger exponent from a number (b) 52 with a smaller exponent, in which rounding to the nearest even value is implemented. FIG. 6 conceptually illustrates an exemplary subtraction of a number (b) 62 with a smaller exponent from a number (a) 60 with a larger exponent, in which rounding to the nearest even value is implemented.

With reference to FIGS. 5 and 6, the mantissa of the subtracted numbers 50, 62 is negated, and the mantissa of the numbers with the smaller exponent 52, 62 is shifted right by a number of bits equal to exp_diff. The two mantissas are added and, if the result is negative, the result 54 is negated, as shown in FIG. 5. A positive result 64 is normalized and rounded, and the exponent is updated, as shown in FIG. 6. For the case of rounding to the nearest even value, the N−2 least significant bits 56 and 66 are logically ORed together to check whether each of these bits is zero. Rounding is then performed according to the result of the logical OR operation. Since hardware supports a worst-case instance, two inverters and two incrementers are implemented to handle the case in which the negative number is the number with the larger exponent as shown in FIG. 5. An additional incrementer is implemented for rounding.

Figure 7:
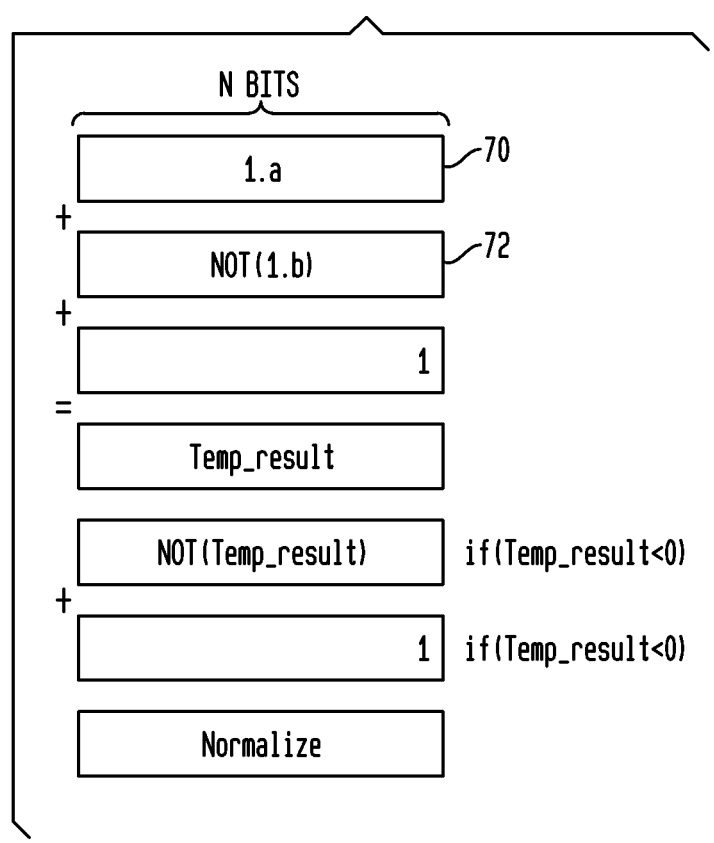
FIG. 7 conceptually illustrates an exemplary subtraction of numbers with equal exponents, in which rounding is not required.

In a second scenario, shown with reference to FIG. 7, the absolute value of the difference between exponents, exp_diff, equals zero. Specifically, FIG. 7 conceptually illustrates an exemplary subtraction of two number, 70 and 72, with equal exponents, in which rounding is not required. In this case, the sign of the result is unknown until the subtraction operation is performed. In a worst-case instance, two inverters and two incrementers are implemented for negations (e.g., one for negation of the input, and one for a negation of the output). However, there is no need to implement an incrementer for rounding since rounding is not required due to the number of meaningful bits not being able to increase, as shown in FIG. 7.

Embodiments of the invention eliminate the need for two incrementers, thus significantly reducing the duration of floating-point operations, as well as the board or chip area required to implement these floating-point operations.

As discussed above, subtraction operations are preferably divided into two scenarios. In the first scenario, the difference between exponents (exp_diff) is not equal to zero, examples of which are shown in FIGS. 5 and 6. In this scenario, embodiments of the invention provide at least two improvements over conventional approaches, as discussed below.

Figure 8:
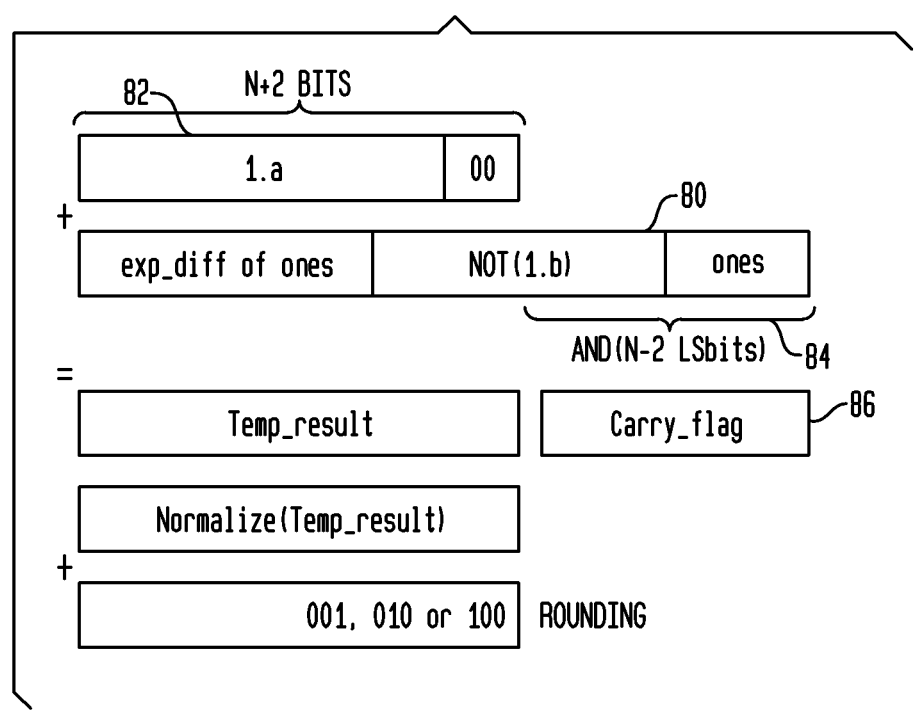
FIG. 8 conceptually illustrates an exemplary subtraction of numbers with unequal exponents, in which rounding to the nearest even value is performed.

FIG. 8 conceptually illustrates an exemplary subtraction of numbers with unequal exponents, in which rounding to the nearest even value is performed. As shown in FIG. 8, a number (b) 80 having a smaller exponent is negated and added to a number (a) 82 having a larger exponent if: (i) number 82 is positive and number 80 is negative; or (ii) number 82 is negative and number 80 is positive. This feature provides a result that is positive and eliminates the need to negate the result, thereby eliminating the need for one inverter and one incrementer. The sign of the result is known in advance and is equal to the sign of the number with the larger exponent. Thus, the sign bit of the result is determined in parallel with the mantissa calculation.

The negation of the number 80 is performed by bit-wise inversion without adding one to the result. The addition of one is performed during rounding of the result, thus eliminating the need for a second incrementer.

Specifically, rounding to the nearest value is performed by adding one to bit N−2 or bit N−1. Bit zero is the right-most bit in the drawings. Each of the N−2 least significant bits 84 are logically ANDed together during the addition operation. The ANDed result, which is represented by a carry flag (carry_flag) 86 in FIG. 8, is used for both rounding to the nearest even value and for incrementing the inverted result of number 80.

If the carry flag 86 equals one, incrementing the inverted result of number 80, if performed, propagates to the N−2 bit location. The exponent of the result of subtracting a number with a smaller exponent from a number with a larger exponent is: (i) the same as the exponent of the number with the larger exponent; (ii) reduced by 1; or (iii) reduced by 2 or more. If the exponent of the result is the same as the exponent of the number with the larger exponent, the most significant bit in the temp_result is equal to 1, and the rounding constant is added to the N−1 bit. If the exponent is reduced by 1, the most significant bit in the temp_result is equal to 0, the next bit is equal to 1, and the rounding constant is added to the N−2 bit. If the exponent is reduced by 2 or more, which occurs if the difference between exponents (exp_diff) is equal to one, the rounding would have no effect since, after normalization, the rounded bits are equal to zero, and thus rounding is not required. Thus, if the rounding 1 is to be added to bit number N−2 and the carry flag 86 is 1, the rounding 1 is added to bit number N−1. If the rounding 1 is to be added to bit number N−2 and the carry flag 86 is 0, the rounding 1 is instead added to bit number N−2. If the rounding 1 is to be added to bit number N−1, the carry flag 86 is 1, and the bit number N−2 is 0, the rounding 1 is added to the N−1 bit. If the rounding 1 is to be added to bit number N−1, the carry flag 86 is 1, and bit number N−2 is equal to 1, the rounding 1 is instead added to bit number N. If the rounding 1 is to be added to bit number N−1 and the carry flag 86 is 0, the rounding 1 is added to bit number N−1.

Figure 9:
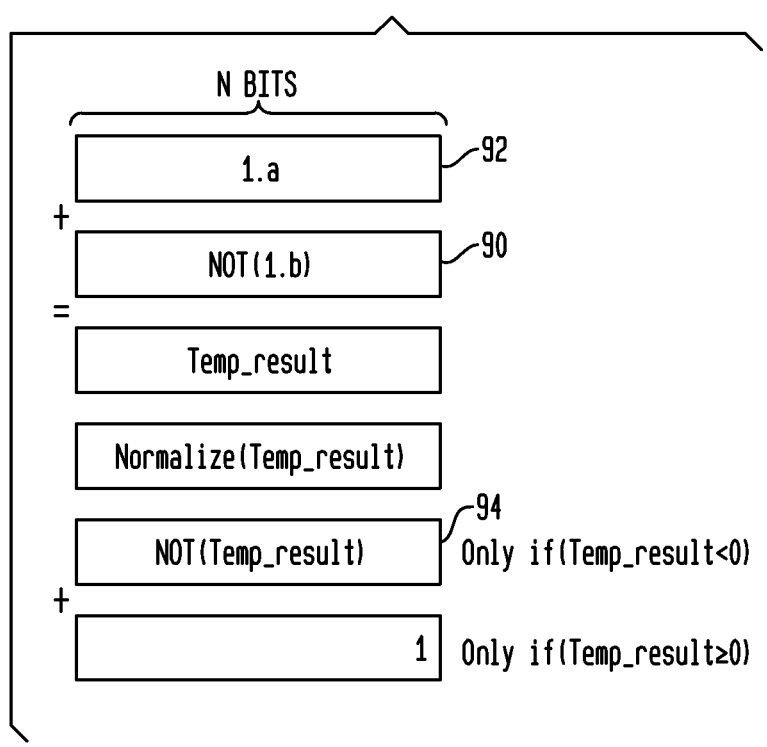
FIG. 9 conceptually illustrates an exemplary subtraction of numbers with equal exponents, in which rounding is not required.

In the second scenario, the difference between exponents of the numbers to be subtracted (exp_diff) is equal to zero (that is, the exponents are the same), and embodiments of the invention are shown in FIG. 9. Specifically, FIG. 9 conceptually illustrates an exemplary subtraction of a first number (b) 90 from a second number (a) 92, with equal exponents, in which rounding is not required. In this scenario, since the sign of the result of subtraction is not known before the subtraction is performed, the mantissa of the number 90 which is to be subtracted is bit-wise inverted. If the result of the calculation is negative, the result 94 is also bit-wise inverted. In this case, embodiments of the invention use the following identity to eliminate both incrementers:

$$\mathrm{NEG}(a-b)=\overline{(a+\overline{b}+1)}+1=\overline{(a+\overline{b}+1-1)}=\overline{(a+\overline{b})}. \quad (5).$$

Thus, the calculation is performed by inverting the input (number 90) to the adder and then inverting the output 94 of the adder. If the result of the subtraction operation is positive, there is no second negation that can cancel the first incrementer. In this case, incrementing is performed by the incrementer that is used for rounding, if there are unequal exponents, since rounding is not required in this case. Thus, embodiments of the invention eliminate the need for two incrementers when performing a subtraction in a floating-point adder.

It is to be understood that any or all of the embodiments of the invention described herein are implementable in any given system without requiring any specific set of embodiments or features. It is also to be noted that the embodiments described herein may be implemented with any type, length, and/or precision of floating-point format. It is further to be noted that while floating-point adders are referred to herein, the embodiments are equally applicable to floating-point operations performed by devices and referred to or identified using different nomenclature, such as, but not limited to subtractors, math units or modules, arithmetic units or modules, and computational units or modules. It is further to be noted that the ordering of steps and/or operations associated with the embodiments herein may be altered while remaining within the intended scope of the embodiments.

Figure 10:
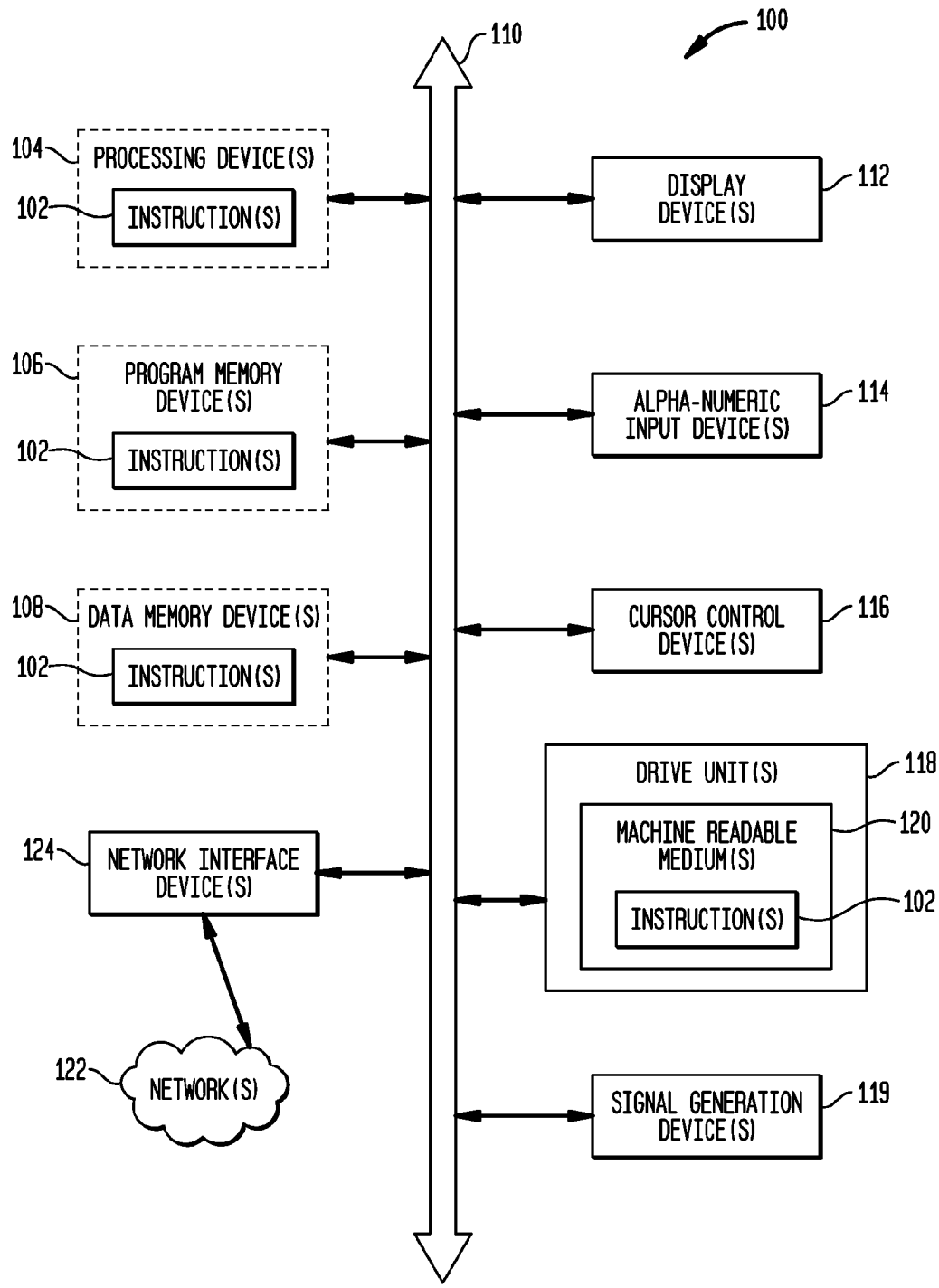
FIG. 10 is a block diagram depicting at least a portion of an exemplary machine in the form of a computing system configured to perform methods according to an embodiment of the invention.

FIG. 10 is a block diagram of an embodiment of a machine in the form of a computing system 100, within which is a set of instructions 102 that, when executed, cause the machine to perform any one or more of the methodologies according to embodiments of the invention. In some embodiments, the machine operates as a standalone device. In some embodiments, the machine is connected (e.g., via a network 122) to other machines. In a networked implementation, the machine operates in the capacity of a server or a client user machine in a server-client user network environment. Exemplary implementations of the machine as contemplated by the invention include, but are not limited to, a server computer, client user computer, personal computer (PC), tablet PC, Personal Digital Assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 100 includes a processing device(s) 104 (e.g., a central processing unit (CPU), a graphics processing unit (GPU), or both), program memory device(s) 106, and data memory device(s) 108, which communicate with each other via a bus 110. The computing system 100 further includes display device(s) 112 (e.g., liquid crystals display (LCD), flat panel, solid state display, or cathode ray tube (CRT)). The computing system 100 includes input device(s) 114 (e.g., a keyboard), cursor control device(s) 116 (e.g., a mouse), disk drive unit(s) 118, signal generation device(s) 120 (e.g., a speaker or remote control), and network interface device(s) 124, operatively coupled together, and/or with other functional blocks, via bus 110.

The disk drive unit(s) 118 includes machine-readable medium(s) 120, on which is stored one or more sets of instructions 102 (e.g., software) embodying any one or more of the methodologies or functions herein, including those methods illustrated herein. The instructions 102 also reside, completely or at least partially, within the program memory device(s) 106, the data memory device(s) 108, and/or the processing device(s) 104 during execution thereof by the computing system 100. The program memory device(s) 106 and the processing device(s) 104 also constitute machine-readable media. Dedicated hardware implementations, such as but not limited to application specific integrated circuits, programmable logic arrays, and other hardware devices can likewise be constructed to implement the methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments, the methods, functions or logic described herein is implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

The embodiment contemplates a machine-readable medium or computer-readable medium containing instructions 102, or that which receives and executes instructions 102 from a propagated signal so that a device connected to a network environment 122 can send or receive voice, video or data, and to communicate over the network 122 using the instructions 102. The instructions 102 are further transmitted or received over the network 122 via the network interface device(s) 124. The machine-readable medium also contain a data structure for storing data useful in providing a functional relationship between the data and a machine or computer in an illustrative embodiment of the systems and methods herein.

While the machine-readable medium 102 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions or logic herein, are optionally stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

Although the specification describes components and functions implemented in the embodiments with reference to particular standards and protocols, the embodiments are not limited to such standards and protocols.

The illustrations of embodiments of the invention described herein are intended to provide a general understanding of the structure of the various embodiments, and they are not intended to serve as a complete description of all the elements and features of apparatus and systems that might make use of the structures described herein. Many other embodiments will become apparent to those of skill in the art upon reviewing the above description. Other embodiments are utilized and derived therefrom, such that structural and logical substitutions and changes are made without departing from the scope of this disclosure. Figures are also merely representational and are not necessarily drawn to scale. Certain proportions thereof may be exaggerated, while others diminished in order to facilitate an explanation of the embodiments of the invention. Accordingly, the specification and drawings are to be regarded in an illustrative rather than a restrictive sense.

Such embodiments of the inventive subject matter are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus the following claims are hereby incorporated into the Detailed Description, with each claim standing on its own as a separate example embodiment.

The Abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings of the invention provided herein, one of ordinary skill in the art will be able to contemplate other implementations and applications of the techniques of the invention. Although illustrative embodiments of the invention have been described herein with reference to the accompanying drawings, it is to be understood that the invention is not limited to those precise embodiments, and that various other changes and modifications are made therein by one skilled in the art without departing from the scope of the appended claims.

What is claimed is:

1. A method of subtracting floating-point numbers, which comprises:
    determining, by a processing device, whether a first sign associated with a first floating-point number is unequal to a second sign associated with a second floating-point number;
    determining, by the processing device, whether a first exponent associated with the first floating-point number is less than a second exponent associated with the second floating-point number;
    negating, by the processing device, a first mantissa associated with the first floating-point number in response to determining that the first sign is unequal to the second sign and determining that the first exponent is less than the second exponent; and
    adding, by the processing device, the first mantissa to a second mantissa associated with the second floating-point number in response to determining that the first sign is unequal to the second sign and determining that the first exponent is less than the second exponent, thereby subtracting the first floating-point number from the second floating-point number.

2. The method of subtracting floating-point numbers, as defined by claim 1, wherein negating the first mantissa further comprises performing bit-wise inversion of the first mantissa without adding one.

3. The method of subtracting floating-point numbers, as defined by claim 1, wherein a result mantissa represents a result of adding the first and second mantissas, and wherein N represents a length of the result mantissa, the method further comprising rounding a result of adding the first and second mantissas by:
    adding one to bit N-1 of the result mantissa in response to a logical AND of N-2 least significant bits of the result mantissa being equal to 1 and a rounding bit to be added to bit N-2 of the result mantissa;
    adding one to bit N-2 of the result mantissa in response to the logical AND of N-2 least significant bits of the result mantissa being equal to 0 and the rounding bit to be added to bit N-2 of the result mantissa;
    adding one to bit N-1 of the result mantissa in response to the logical AND of N-2 least significant bits of the result mantissa being equal to 1 and bit N-2 of the result mantissa being equal to 0 and the rounding bit to be added to bit N-1 of the result mantissa;
    adding one to bit N of the result mantissa in response to the logical AND of N-2 least significant bits of the result mantissa being equal to 1, bit N-2 of the result mantissa being equal to 1 and the rounding bit to be added to bit N-1 of the result mantissa; and
    adding one to bit N-1 of the result mantissa in response to the logical AND of the N-2 least significant bits of the result mantissa being equal to 0 and the rounding bit to be added to bit N-1 of the result mantissa.

4. The method of subtracting floating-point numbers, as defined by claim 1, further comprising equating a sign associated with the result of adding the first and second mantissas to the second sign.

5. The method of subtracting floating-point numbers, as defined by claim 1, further comprising:
    determining, by the processing device, whether the first exponent is equal to the second exponent in response to the first floating-point number to be subtracted from the second floating-point number;
    negating, by the processing device, the first mantissa in response to determining that the first exponent is equal to the second exponent; and
    adding, by the processing device, the negated first mantissa to the second mantissa in response to determining that the first exponent is equal to the second exponent.

6. The method of subtracting floating-point numbers, as defined by claim 5, further comprising negating, by the processing device, a result of adding the negated first mantissa to the second mantissa in response to determining that the first exponent is equal to the second exponent and determining that the result of adding the negated first mantissa to the second mantissa having a negative sign.

7. The method of subtracting floating-point numbers, as defined by claim 5, wherein negating the first mantissa further comprises performing a bit-wise inversion of the first mantissa without adding one.

8. A non-transitory computer-readable medium comprising instructions that, when executed by a processing device, performs a method of subtracting floating-point numbers, which comprises:
   determining whether a first sign associated with a first floating-point number is unequal to a second sign associated with a second floating-point number;
   determining whether a first exponent associated with the first floating-point number is less than a second exponent associated with the second floating-point number;
   negating a first mantissa associated with the first floating-point number in response to determining that the first sign is unequal to the second sign and determining that the first exponent is less than the second exponent; and
   adding the first mantissa to a second mantissa associated with the second floating-point number in response to determining that the first sign is unequal to the second sign and determining that the first exponent is less than the second exponent.

9. The non-transitory computer-readable medium, as defined by claim 8, wherein negating the first mantissa further comprises performing bit-wise inversion of the first mantissa without adding one.

10. The non-transitory computer-readable medium, as defined by claim 8, wherein a result mantissa represents a result of adding the first and second mantissas, and wherein N represents a length of the result mantissa, the method further comprising rounding a result of adding the first and second mantissas by:
   adding one to bit N-1 of the result mantissa in response to a logical AND of N-2 least significant bits of the result mantissa being equal to 1 and a rounding bit to be added to bit N-2 of the result mantissa;
   adding one to bit N-2 of the result mantissa in response to the logical AND of N-2 least significant bits of the result mantissa being equal to 0 and the rounding bit to be added to bit N-2 of the result mantissa;
   adding one to bit N-1 of the result mantissa in response to the logical AND of N-2 least significant bits of the result mantissa being equal to 1 and bit N-2 of the result mantissa being equal to 0 and the rounding bit to be added to bit N-1 of the result mantissa;
   adding one to bit N of the result mantissa in response to the logical AND of N-2 least significant bits of the result mantissa being equal to 1, bit N-2 of the result mantissa being equal to 1 and the rounding bit to be added to bit N-1 of the result mantissa; and
   adding one to bit N-1 of the result mantissa in response to the logical AND of the N-2 least significant bits of the result mantissa being equal to 0 and the rounding bit to be added to bit N-1 of the result mantissa.

11. The non-transitory computer-readable medium, as defined by claim 8, wherein the method further comprises equating a sign associated with the result of adding the first and second mantissas plus one to the second sign.

12. The non-transitory computer-readable medium as defined by claim 8, wherein the method further comprises:
   determining whether the first exponent is equal to the second exponent in response to the first floating-point number to be subtracted from the second floating-point number;
   negating the first mantissa from the second mantissa in response to determining that the first exponent is equal to the second exponent; and
   adding the negated first mantissa to the second mantissa in response to determining that the first exponent is equal to the second exponent.

13. The non-transitory computer-readable medium, as defined by claim 12, wherein negating the first mantissa further comprises performing a bit-wise inversion of the first mantissa without adding one.

14. The non-transitory computer-readable medium, as defined by claim 12, wherein the method further comprises negating, by the processing device, a result of adding the negated first mantissa to the second mantissa in response to determining that the first exponent is equal to the second exponent and the result of adding the negated first mantissa to the second mantissa having a negative sign.

15. A device to subtract floating-point numbers, which comprises:
   at least one processing device, the at least one processing device being configured:
      to determine whether a first sign associated with a first floating-point number is unequal to a second sign associated with a second floating-point number;
      to determine whether a first exponent associated with the first floating-point number is less than a second exponent associated with the second floating-point number;
      to negate a first mantissa associated with the first floating-point number in response to determining that the first sign is unequal to the second sign and determining that the first exponent is less than the second exponent; and
      to add the first mantissa to a second mantissa associated with the second floating-point number in response to determining that the first sign is unequal to the second sign and determining that the first exponent is less than the second exponent, thereby subtracting the first floating-point number from the second floating-point number.

16. The device as defined by claim 15, wherein the at least one processing device is further configured to perform bit-wise inversion of the first mantissa without adding one.

17. The device as defined by claim 15, wherein a result mantissa represents a result of adding the first and second mantissas, and wherein N represents a length of the result mantissa, the at least one processing device being further configured to round a result of adding the first and second mantissas by:
   adding one to bit N-1 of the result mantissa in response to a logical AND of N-2 least significant bits of the result mantissa being equal to 1 and a rounding bit to be added to bit N-2 of the result mantissa;
   adding one to bit N-2 of the result mantissa in response to the logical AND of N-2 least significant bits of the result mantissa being equal to 0 and the rounding bit to be added to bit N-2 of the result mantissa;
   adding one to bit N-1 of the result mantissa in response to the logical AND of N-2 least significant bits of the result mantissa being equal to 1 and bit N-2 of the result mantissa being equal to 0 and the rounding bit to be added to bit N-1 of the result mantissa;
   adding one to bit N of the result mantissa in response to the logical AND of N-2 least significant bits of the result mantissa being equal to 1, bit N-2 of the result mantissa being equal to 1 and the rounding bit to be added to bit N-1 of the result mantissa; and adding one to bit N-1 of the result mantissa in response to the logical AND of the N-2 least significant bits of the result mantissa being equal to 0 and the rounding bit to be added to bit N-1 of the result mantissa.

18. The device as defined by claim 15, wherein the at least one processing device is further configured to equate a sign associated with the result of adding the first and second mantissas to the second sign.

19. The device as defined by claim 15, wherein the at least one processing device is further configured:
  to determine whether the first exponent is equal to the second exponent in response to the first floating-point number to be subtracted from the second floating-point number;
  to negate the first mantissa from the second mantissa in response to determining that the first exponent is equal to the second exponent; and
  to add the negated first mantissa to the second mantissa in response to determining that the first exponent is equal to the second exponent.

20. The device as defined by claim 19, wherein the at least one processing device is further configured to negate the first mantissa by performing a bit-wise inversion of the first mantissa without adding one.

21. The device as defined by claim 19, wherein the at least one processing device is further configured to negate a result of adding the negated first mantissa to the second mantissa in response to determining that the first exponent is equal to the second exponent and the result of adding the negated first mantissa to the second mantissa having a negative sign.

* * * * *